4850X
E. Warren.
Thrashing Mach.
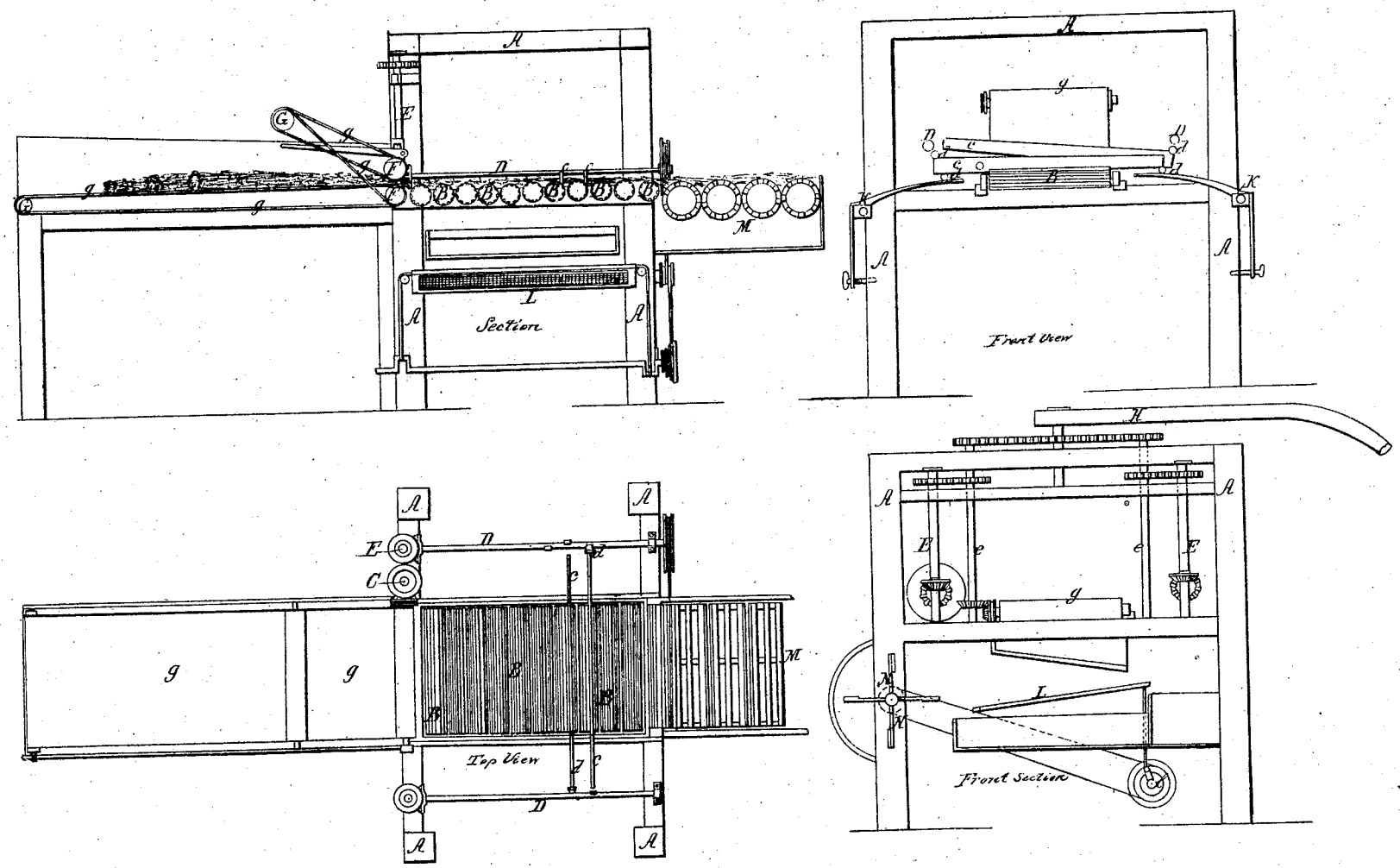
Patented Aug. 11, 1847.